United States Patent
Motilewa

[11] Patent Number: 5,984,613
[45] Date of Patent: Nov. 16, 1999

[54] CARGO LIFT AND TRANSPORT DEVICE FOR MOTOR VEHICLE

[76] Inventor: Muchiri O. Motilewa, 4200 Miners Creek Rd., Lithonia, Ga. 30038

[21] Appl. No.: 09/330,281

[22] Filed: Jun. 11, 1999

Related U.S. Application Data

[63] Continuation-in-part of application No. 09/057,315, Apr. 9, 1998.

[51] Int. Cl.$^6$ ....................................................... B60P 9/00
[52] U.S. Cl. ........................... 414/462; 224/519; 224/521; 280/766.1
[58] Field of Search .............................. 414/462; 224/510, 224/518, 519, 521, 497; 280/760, 766.1

[56] References Cited

U.S. PATENT DOCUMENTS

| | | | |
|---|---|---|---|
| 4,741,660 | 5/1988 | Kent | 414/462 |
| 4,775,282 | 10/1988 | Van Vliet | 414/462 |
| 5,011,361 | 4/1991 | Peterson | 414/462 |
| 5,122,024 | 6/1992 | Stokes . | |
| 5,137,411 | 8/1992 | Eul et al. | 414/462 |
| 5,366,338 | 11/1994 | Mortensen . | |
| 5,431,522 | 7/1995 | Ross | 414/462 |
| 5,482,424 | 1/1996 | Jones et al. | 414/462 |
| 5,752,636 | 5/1998 | Manley | 414/462 |

Primary Examiner—Robert P. Olszewski
Assistant Examiner—Gregory A. Morse
Attorney, Agent, or Firm—Barry E. Kaplan; Hughes & Kaplan

[57] ABSTRACT

Provided is a cargo lift and transport device which affixes to a frame mounted motor vehicle-to-trailer hitch interface having two mounting positions. The cargo lift and transport device provides a connector that receives and locks into a female-to-female adapter which locks into the female receiver connector of the frame mounted motor vehicle-to-hitch interface. The device provides a second female connector for lockably receiving a male connector affixed to and adjacent a cargo platform. The cargo lift and transport device provides means for selectively moving the second female connector in the vertical plane with enough force to overcome the resistance of friction and the weight of the cargo to be transported. In the first mounting position, the cargo lift and transport device, so mounted, operates to lower the cargo platform to the ground level (H) for loading or unloading of the cargo, and then to raise the cargo platform to a variable, but safe, transportation height (H') of the user's selection. In the second mounting position, the cargo lift and transport device, so mounted, operates to lift the cargo platform from the H' position to a higher variable (H") position.

23 Claims, 5 Drawing Sheets

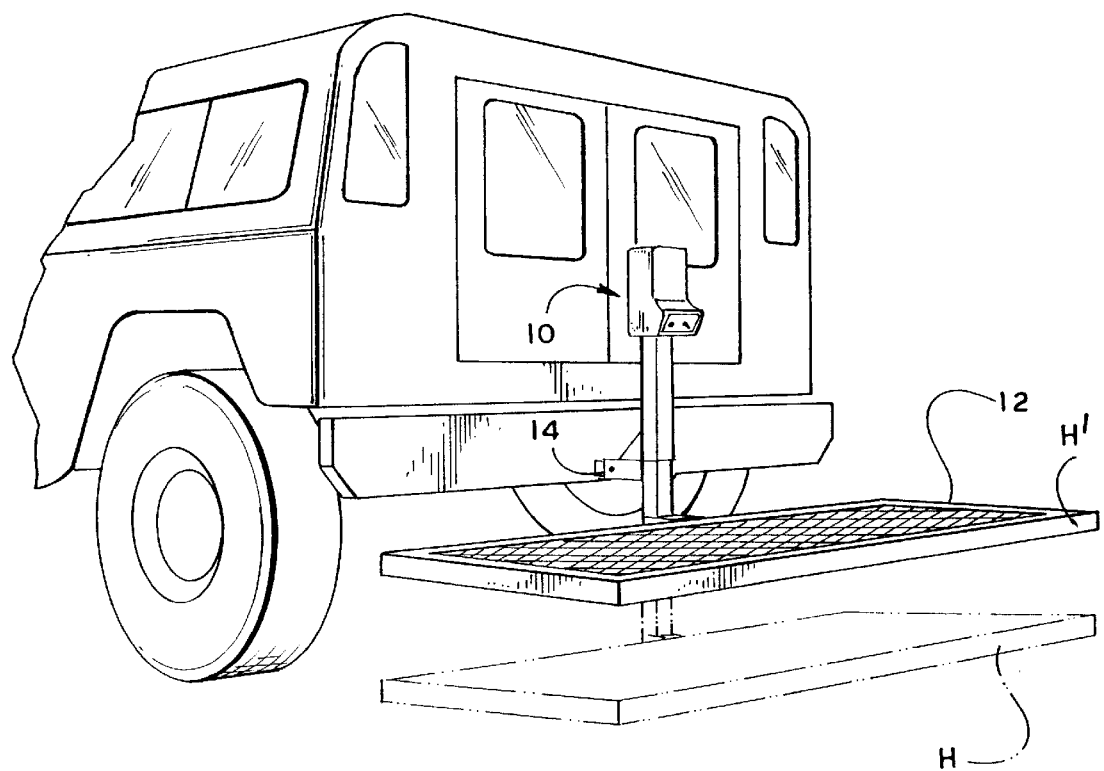
Fig_1A

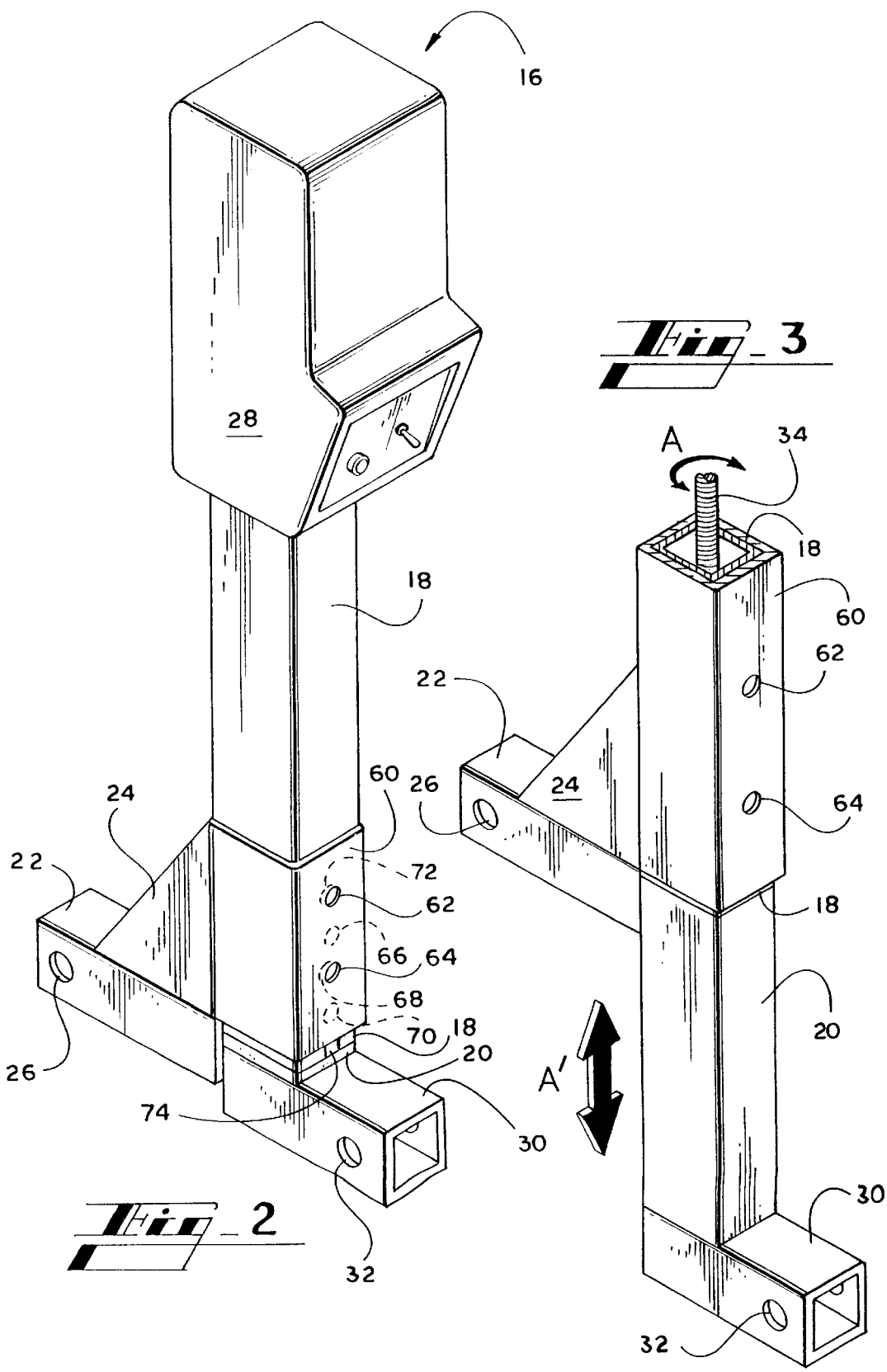

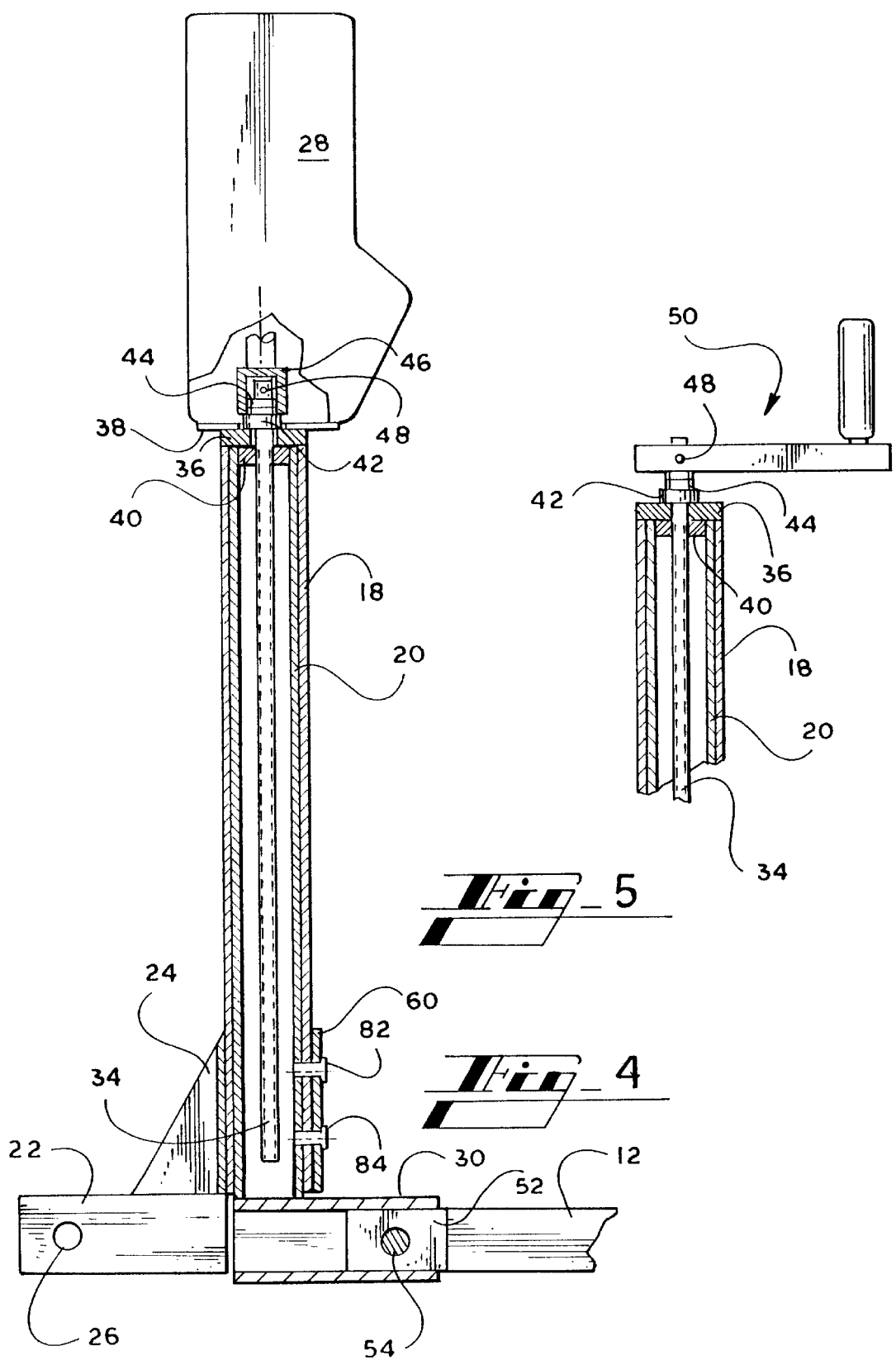

CARGO LIFT AND TRANSPORT DEVICE FOR MOTOR VEHICLE

RELATED APPLICATIONS

This application is a continuation in part of application Ser. No. 09/057,315 filed on Apr. 9, 1998.

FIELD OF THE INVENTION

This invention relates generally to cargo towing attachments for motor vehicles and specifically to a device for lifting and transporting cargo on a motor vehicle.

BACKGROUND OF THE INVENTION

The trailer towing industry has adopted standardized motor vehicle-to-trailer hitch interfaces in order to simplify and make more compatible the towing-related products of various manufacturers. This standardization has contributed to the wide availability of many products, typically in the nature of trailers, that enable one to tow cargo behind a motor vehicle. Many of the motor vehicle-to-trailer interfaces provide a frame for affixing to the vehicle, and further provide an attachment having a ball joint for use in mating a trailer thereto.

Platforms and lifts are also known in the cargo handling and transportation industry. Typically, a lift, including a platform, is mounted to the back of a cargo transportation truck. Cargo may be placed on the platform, raised to the level of the truck bed, and then placed into the truck for transport. In such applications, the platform must often be stowed in a vertical position during transport. This stowing configuration is sometimes disadvantageous to the broader application and use of such devices for the reason that such devices often are not conducive to transporting the cargo upon the platform while in its, horizontal position. Additionally, such devices often are not conducive to mounting on motor vehicles other than trucks.

In an attempt to overcome some of these deficiencies, a variety of lift and tow devices have been proposed. Examples of such devices may be found by reference to U.S. Pat. No. 5,122,024 to Stokes; U.S. Pat. No. 5,366,338 to Mortensen; and U.S. Pat. No. 5,482,424 to Jones et al. In light of the present invention, however, these devices are disadvantageous. For instance, the respective platforms of Stokes, Mortensen, and Jones et al. can not be raised above the height of the automobile's trailer hitch. As a result, these devices and their cargo can be damaged during off-road maneuvers due to the close proximity to the ground. Additionally, because of the limitation in the range of motion of the above-referenced devices, their uses are also notably limited.

While devices of the above-described type may be effective for certain applications, there remains a significant need in the industry for an effective cargo lift and transport device which can be easily fit into a standard motor vehicle-to-trailer hitch interface, without significant modification to either the vehicle or the vehicle-to-trailer hitch and can lift the cargo to a safe distance from the ground, and that can additionally serve to lift a multitude of cargo for numerous applications.

In order to be effective for its purpose, such a device should be able to be mounted on motor vehicles of types other than large cargo trucks, such as automobiles, light duty trucks, sport utility vehicles, or all-terrain vehicles. Such a device should further be adjustable to allow a multitude of vertical positions to serve the purpose of a plurality of applications. Additionally, such a device should be capable of carrying a relatively heavy load, such as a motorcycle or a motorized wheelchair, in a stable and secure manner. Such a device should be semi-permanent, but easily removable for storage.

Accordingly, the several objects of the present invention are:

to provide a cargo lift and transport device that can easily fit into a standard motor vehicle-to-trailer hitch interface;

to provide an effective cargo lift and transport device that can easily fit into a standard motor vehicle-to-trailer hitch interface without significant modification to either the vehicle or the vehicle-to-trailer hitch;

to provide a cargo lift and transport device that is reversible to allow a greater degree of vertical mobility;

to provide a cargo lift and transport device that is adjustable to provide various vertical positions to accommodate a multitude of vehicles and applications;

to provide a cargo lift and transport device that can be mounted on motor vehicles of types other than large cargo trucks;

to provide a cargo lift and transport device that is capable of carrying a relatively heavy load in a stable and secure manner;

to provide a cargo lift and transport device that is semi-permanent, but easily removable for storage;

to provide a cargo lift and transport device that is durable in construction and economical to manufacture;

to provide a cargo lift and transport device that is convenient to install and to maintain; and, to provide a cargo lift and transport device that is safe and reliable in operation.

It is the solution to these and other problems to which the present invention is directed.

SUMMARY OF THE INVENTION

The present invention solves the above-described problems associated with various cargo lifting and transportation devices by providing a cargo lift and transport device which affixes to a frame mounted vehicle-to-trailer hitch interface. The device provides a male adapter for a female-to-female connection, wherein one end is inserted and locked into the female receiver connector of the frame mounted vehicle-to-hitch interface and the other end is inserted and locked into one of two female receiver connectors of the lift. The second female connector is provided for lockably receiving a male connector affixed and adjacent to a cargo transportation platform. The device is reversible such that either female connector may be utilized as necessary for a specific application. The device provides means for selectively moving the female connectors in the vertical plane with enough force to overcome the resistance of friction and the weight of the cargo to be transported.

The device, so mounted, operates to lower the platform to the ground for loading or unloading of the cargo, and then to raise the platform to a variable, but safe, transportation height of the user's selection. For applications wherein it is desired to lift the cargo above the height of the trailer hitch of the vehicle, the device may be reversed such that the first female connector receives the cargo transportation platform and the second female connector receives one end of the female-to-female adapter.

Other objects, features, and advantages of the present invention will become apparent to those skilled in the art by reference to the following detailed description.

BRIEF DESCRIPTION OF THE DRAWINGS

The invention is better understood by reading the Detailed Description of the Preferred Embodiment with reference to the accompanying drawing figures, in which like reference numerals denote similar structure and refer to like elements throughout, and in which:

FIG. 1A is a perspective view of the cargo lift and transport device, as affixed to a representative motor vehicle, according to the preferred embodiment of the present invention;

FIG. 2 is a perspective view of the lift portion of the cargo lift and transport device in one raised position, according to the preferred embodiment of the present invention;

FIG. 3 is a perspective view of the lift portion of the cargo lift and transport device in an alternate position, according to the preferred embodiment of the present invention;

FIG. 4 is a partial sectional view of the lift portion of the cargo lift and transport device of FIG. 2, according to the preferred embodiment of the present invention;

FIG. 5 is a partial sectional view of the lift portion of the cargo lift and transport device, according to an alternate embodiment of the present invention; and, FIG. 6 is a perspective view of the female-to-female adapter, according to a preferred embodiment of the present invention.

DETAILED DESCRIPTION OF THE PREFERRED EMBODIMENT

In describing preferred embodiments of the present invention illustrated in the figures, specific terminology is employed for the sake of clarity. The invention, however, is not intended to be limited to the specific terminology so selected, and it is to be understood that each specific element includes all technical equivalents which operate in a similar manner to accomplish a similar purpose.

Figure 1B:
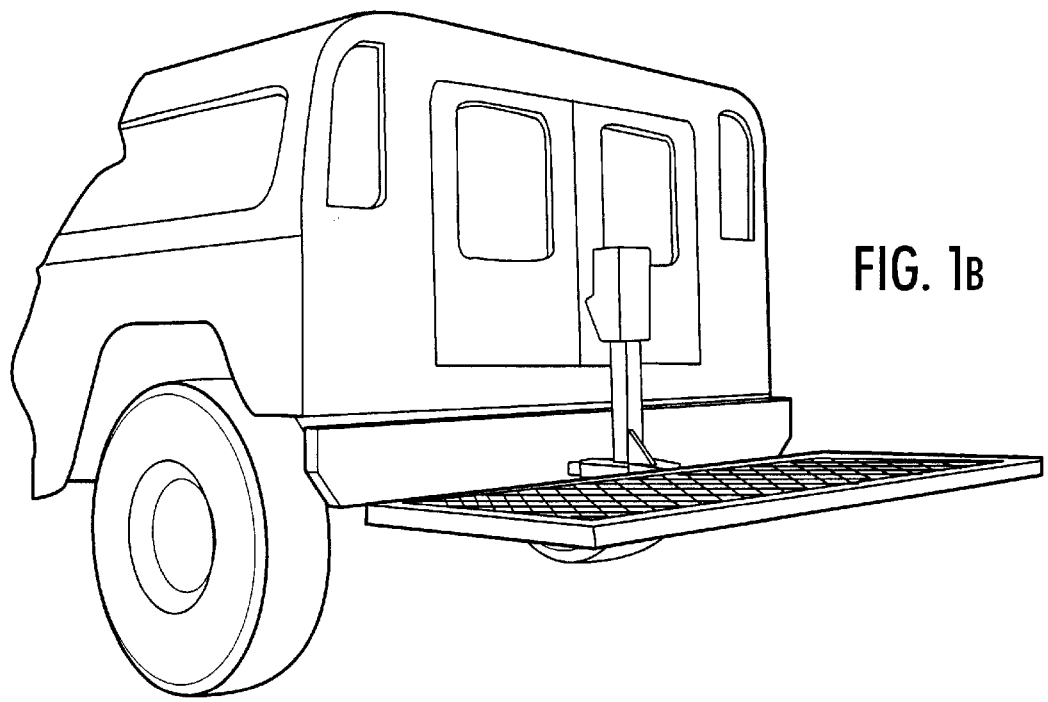
FIG. 1B is a perspective view of the cargo lift and transport device, as affixed to a representative motor vehicle in the reverse and lowered position, according to the preferred embodiment of the present invention.
Figure 1C:
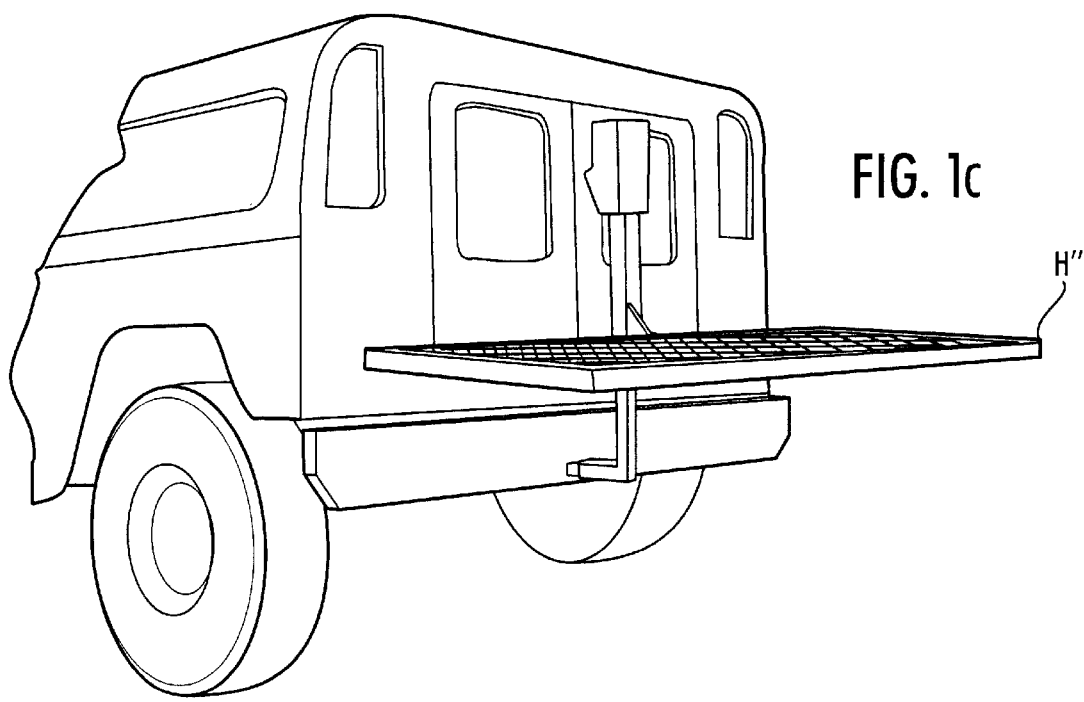
FIG. 1C is a perspective view of the cargo lift and transport device, as affixed to a representative motor vehicle in the reverse and raised position, according to the preferred embodiment of the present invention.
Figure 6:
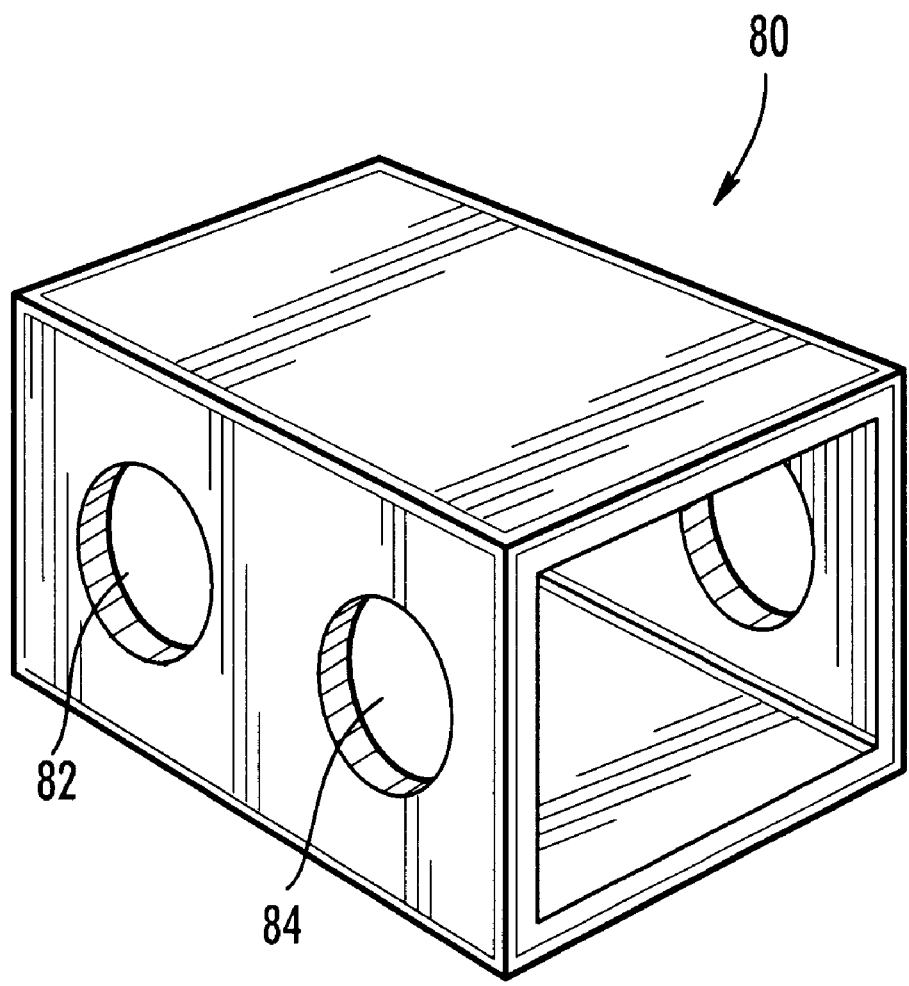

The cargo lift and transport device 10 according to FIGS. 1 through 5 is provided, generally, to mount a cargo platform 12 to a motor vehicle-to-trailer hitch interface 14 and to raise and lower that cargo platform 12 between a plurality of elevations. The cargo lift and transport device 10, so mounted, operates to lower the cargo platform 12 to ground level H for loading or unloading of the cargo, and then to raise the cargo platform 12 to a variable, but safe, transportation height H' of the user's selection. As best seen by reference to FIG. 1A, the designations H and H' represent the nominal end-of-travel points of the cargo lift and transport device 10. As best seen by reference to FIGS. 1B, and 1C and as more fully described below, for heights above H', device 10 can be reversed, thus allowing cargo platform 12 to be raised to height H".

Since the motor vehicle itself does not constitute any part of the present invention, it has not been shown in detail, nor will it be further described, except to the extent required to disclose the installation and use of the cargo lift and transport device 10 of the present invention.

The frame mounted, motor vehicle-to-trailer hitch interface 14 that is preferably used in conjunction with this cargo lift and transport device 10 is a Draw-Tite® hitch or, alternatively, a Reese® hitch or similar design. In a preferred embodiment, a Draw-Tite® hitch rated for one thousand pounds tongue weight, ten thousand pounds gross trailer weight may be used.

Shown in FIGS. 1 through 4 is the cargo lift and transport device 10 according to the preferred embodiment of the present invention. It will be appreciated that the cargo lift and transport device 10 is fabricated from any suitable material, typically steel, titanium, or equivalent metals, alloys, or composites known in the art, having suitable structural and physical properties for the purposes disclosed hereinbelow.

The cargo lift and transport device 10 preferably is constructed of a strong, rigid steel tubing material. The material preferably should be of square or rectangular cross-section in order to prevent rotation of each cooperating portion relative to the other. It will be appreciated, however, that a material of any non-round cross section will be appropriate to meet this criterion, as would be any material of round cross-section having any of a variety of inhibiting means, known in the art, to prevent such relative rotation.

As shown in FIG. 2, the outer column housing assembly 16 is provided with an outer column 18 for receiving the lift column 20. The outer column housing assembly 16 is further provided with a female connector 22 for receiving one end of a female-to-female adapter 80, wherein the other end of the female-to-female adapter 80 is inserted into the related female connector of the hitch portion of the motor vehicle-to-trailer hitch interface 14. At least one structural web 24 advantageously is provided between the adjustable collar 60 and the female connector 22 in order to stiffen and stabilize the outer column housing assembly 16. Adjustable collar 60 is dimensioned to slideably engage around column 18. Preferably, two throughholes 62, 64 are formed on one side of adjustable collar 60 and a plurality of throughholes 72, 66, 68, 70 are formed along the same side of column 18 for receiving bolts 82, 84 to provide a means for adjustably securing column 18 at various heights relative to adjustable collar 60. A nut clearance channel 74 is formed along the wall of column 18 having throughholes 72, 66, 68, 70 for providing a means for securing nuts (not shown) aligned with throughholes 72, 66, 68, 70 such that the nuts will not interfere with the slidability of adjustable collar 60 over column 18. Alternatively, a recessed area dimensioned for a nut may be formed around each throughhole 72, 66, 68, 70. Additionally, any suitable well-known securing means may be utilized to secure adjustable collar 60 to column 18.

The female connector 22 is provided with at least one throughhole 26 for the purpose of orienting and locating the mating portions, and for receiving a quick-release type, hardened-steel locking pin to join the outer column housing assembly 16 to the female-to-female adapter 80 and, thus, to the motor vehicle-to-trailer hitch interface 14, all as described more fully hereinbelow. Throughholes 84 are formed on one end of female-to-female adapter 80, and throughholes 82 are formed on the other end of female-to-female adapter 80, wherein throughholes 82 align with throughholes formed in the motor vehicle-to-trailer hitch interface 14, and throughholes 84 align with throughhole 26 or, if device 10 is used in the reversed position, throughhole 32.

In the preferred embodiment, a motor 28 (Atwood Power Jack Co., Inc.) is provided as the uppermost component of the outer column housing assembly 16. As described more fully hereinbelow, motor 28 provides torque to the lift column 20 in order to raise and lower the cargo platform 12.

With continued reference to FIG. 2, the cargo lift and transport device 10 of the preferred embodiment further provides that lift column 20 is slideably received into the outer column 18. The lift column 20 is provided with a female connector 30 or receiving the related male connector of the cargo platform 12 or, if device 10 is utilized in the reversed position, for receiving one end of the female-to-female adapter 80. This female connector 30 is also provided with at least one throughhole 32 for the purpose of orienting and locating the mating portions, and for receiving a quick-release type, hardened-steel locking pin to lockably Join the lift column 20 to the cargo platform 12 or female-to-female adapter 80, all as described more fully hereinbelow.

Referring now to FIG. 3, it may be seen that a threaded lifting rod 34, or screw, is provided to transfer the operational torque of the motor 28 to the lift assembly. As motor 28 rotates the threaded lifting rod 34, as denoted by the rotational arrow A of FIG. 3, its motion is translated into the desired vertical motion, as denoted by the translational arrow A' of FIG. 3. The direction of vertical motion may be changed by reversing the operational direction of motor 28. In the preferred embodiment, the threaded lifting rod 34 is preferably a suitable length of three-quarter inch (¾") threaded rod stock, although it will be appreciated by those skilled in the art that any suitably sized threaded rod may be selected for this use, consistent with the overall dimensions of the cargo lift and transport device 10 and the structural requirements of the cargo to be transported.

Referring next to FIG. 4, the cargo lift and transport device 10 is shown in further detail. Column cap 36 may be welded at the top of the outer column 18 for the purposes of closing the outer column 18 and providing structural support for motor mounting plate 38. Motor mounting plate 38 may be welded or bolted at the top of the column cap 36 for the purposes of mounting the electrical motor 28. The motor mounting plate 38 may be flat stock, with through holes drilled to accommodate the bolts of the motor 28. Typically, the motor 28 is mounted to motor mounting plate 38 by four nut and bolt combinations in accordance with the specifications of the motor manufacturer.

In the preferred embodiment, the lift column 20 is fabricated with a nut 40 welded adjacent the inner cavity of the lift column 20 at its uppermost end. The threaded lifting rod 34 is screwed through the nut 40 and the lowermost end of the threaded lifting rod 34 is suitably damaged, or otherwise mechanically limited, such that it cannot be withdrawn through the threads of the nut 40.

With continuing reference to FIG. 4, over the threaded lifting rod 34 is fit a thrust bearing 42 (Switches, Inc., Indianapolis, Ind.) abutting column cap 36. A combination of counter-tightened hexagonal drive-nuts 44 are provided for the purpose of both capturing thrust bearing 42 in position and providing torque transfer means for rotating the threaded lifting rod 34. It is readily apparent that the drive-nuts 44 further allow substantially the entire weight of the lift assembly, along with its cargo load, to rest upon the thrust bearing 42.

Motor 28 is further provided with a hex drive-socket 46 for transferring torque to hex drive-nuts 44. Additionally, or alternatively, a suitably hardened roll-pin 48, or equivalent, could optionally be inserted through holes provided for this purpose in both the hex drive-socket 46 and the threaded lifting rod 34 to secure the handle to the nut.

Should there be an electrical failure of any type, the motor 28 may be removed and a crank handle 50 (Atwood Power Jack Co., Inc.), best seen in FIG. 5, inserted and used in its place. The crank handle 50 may be a metal, die-stamped, flat type with a freely rotating handle. The preferred form of the crank handle 50 has a hexagonal opening that fits over drive-nuts 44.

It can be seen that relative movement between the outer column 18 and the lift column 20, in a telescoping fashion, is accomplished when the threaded lifting rod 34 is rotated about its axis. This movement results because the lift column 20 tends to travel along the threaded lifting rod 34 by virtue of the fixed position of nut 40 relative to lift column 20. The outer column 18 serves to stabilize and slideably constrain lift column 20 during its movement.

Correct operation of the cargo lift and transport device 10 is enhanced by sizing the outside dimensions of lift column 20 relative to the inside dimensions of the outer column 18. It should be obvious to one skilled in the art that this relative fit should ensure sufficient clearance to minimize friction and allow for lubrication of the device, but not so much clearance as to cause instability about any dimensional axis, or excessive vibration of the cargo load, when the vehicle is in motion.

The platform 12 preferably is constructed of square or rectangular steel tubing, manufactured rectangular in overall shape, and sized to approximate the width of the vehicle. It will be appreciated, however, that a platform of any shape and size appropriate to the size of the vehicle and the cargo to be carried may be provided. The center of the platform 12 may be reinforced with similarly constructed braces, or in any appropriate manner known in the art. The platform 12 preferably is provided with an expanded steel floor; however, it will be appreciated that any lightweight, strong material may be used consistent with the cargo intended to be carried.

The platform 12 is equipped with a male connector 52, best seen by reference to FIG. 4, providing a mating fit with the corresponding female connector 30 of the lift column 20, or female connector 22 when device 10 is utilized in the reverse position. This male connector 52 is also provided with at least one throughhole for the purpose of orienting and locating the mating portions, and for receiving a quick-release type, hardened-steel locking pin 54 to lockably join the lift column 20 to the cargo platform 12.

The cargo platform 12 may optionally include a series of conventional safety reflectors on appropriate exterior portions of the platform. Additionally, brake lights having standard electrical connectors may be mounted to the cargo platform 12. These brake lights are connected to the existing brake light system of the vehicle in a manner well known in the art.

The cargo platform 12 optionally may be provided with a series of eyebolts, preferably at least six in number, that can be used for attaching and securing the cargo load, or for stabilizing the cargo platform 12 to the vehicle frame or bumper.

Optionally mounted to the cargo platform 12 may be a number of wheels, preferably at least four in number, such that when the platform is disconnected from the lift column 20, the cargo platform 12 can be easily rolled, either with or without its cargo load, into a storage area or into a better position for use. Another advantage of a cargo platform 12 so provided is that the cargo platform 12 may be disconnected from the lift column 20, and turned nominally parallel to the axis of the vehicle. The vehicle may then be parked over the platform as a convenience to storage.

In use in heights between H and H', the quick release construction of the cargo lift and transport device 10 allows easy attachment both to a motor vehicle and to a cargo load. The cargo lift and transport device 10, via female-to-female adapter 80 and female connector 22, is slideably engaged to the hitch portion of the motor vehicle-to-trailer hitch interface 14. The cargo lift and transport device 10 is properly installed to the vehicle by aligning throughholes 26 of the female connector 22 with throughholes 84 of female-to-female adapter 80 and throughholes 82 of female-to-female adapter 80 with the throughholes of the hitch, and then installing locking pins 54. Then, lift column 20 is lowered to ground level H. Cargo platform 12 is then slideably engaged to the female connector 30 of lift column 20. The cargo platform 12 is properly installed by aligning the throughholes 32 of the mating portions of the cargo platform 12 and the lift column 20, and then installing a second locking pin, in form equivalent to locking pin 54. By reversing the process, the cargo lift and transport device 10 easily can be removed and transported in the trunk or other suitable storage area of the vehicle until needed.

To utilize device 10 for applications wherein it is desired to raise cargo platform 12 to a height between H' and H", the position of device 10 may be reversed. In other words, device 10, via female-to-female adapter 80 and female connector 30, is slideably engaged to the hitch portion of the motor vehicle-to-trailer hitch interface 14. The cargo lift and transport device 10 is properly installed to the vehicle by aligning throughholes 32 of the female connector 30 with throughholes 84 of female-to-female adapter 80 and throughholes 82 of female-to-female adapter 80 with the throughholes of the hitch, and then installing locking pins 54. Cargo platform 12 is then slideably engaged to the female connector 22. The cargo platform 12 is properly installed by aligning the throughholes 26 of the mating portions of the cargo platform 12 and the female connector 20, and then installing a second locking pin, in form equivalent to locking pin 54. By reversing the process, the cargo lift and transport device 10 easily can be removed and transported in the trunk or other suitable storage area of the vehicle until needed.

The height of the cargo lift and transport device 10 is best determined by calculating the amount of desired travel, measured from the fully down, ground level position H to height position H' and/or from height position H' to H" for the reversed positioning of device 10. As an example, the desired travel for use of the cargo lift and transport device 10 with an A. M. General Hummer® is approximately sixteen inches. Sufficient overlap is required to keep the outer column 18 and the lift column 20 from either separating or binding when fully extended. In practice, this overlap dimension can be approximated as twice the outside width of outer column 18, in the case of rectangular column materials.

Having thus described the preferred embodiment of the present invention, it should be noted by those skilled in the art that the within disclosures are exemplary only and that various other alternatives, adaptations, and modifications may be made within the scope of the present invention.

For example, it is apparent that rotation of the threaded lifting rod 34 may be accomplished by any of several methods, which can include, but are not limited to: an electric motor, as in the preferred embodiment of the present invention, with gear reduction sufficient to accommodate the desired lifting capacity; hydraulics; power take-off from the vehicle engine; or a handcrank.

It further will be appreciated by those skilled in the art that the motor 28 may be suitably mounted at alternative locations adjacent the outer column 18. In such alternate configurations, the drive mechanism and columns would be modified in such a manner, well known in the art, to provide suitable power-coupling gearing to the drive assembly, and to provide for appropriate mechanical clearances to enable operation of such additional drive components.

It will be still further appreciated by those skilled in the art that the cargo platform 12 may be provided in a form whereby it may be pivoted and stowed in a substantially vertical position when being transported without cargo, and yet while still affirmed to the cargo lift and transport device 10. It will also be obvious to those skilled in the art that the cargo platform 12 may take the form of lifting arms, hooks, conventional towing-balls, or other supports, tools, or plows without adversely affecting the intended use or operation of the cargo lift and transport device 10.

It will be appreciated by those skilled in the art that the cargo lift and transport device 10 might be utilized for other purposes than those heretofore described. For example, the cargo lift and transport device 10 might be used as a jack to elevate the vehicle. When equipped with an appropriate tool or plowing extension, it might be extended below ground level for plowing or other anchoring purposes.

It will be appreciated by those skilled in the art that female connectors 22 and 30 may be male connectors, and male connector 52 of platform 12 may be a female connector thus eliminating the use of the female-to-female adapter 80.

Accordingly, the present invention is not limited to the specific embodiments as illustrated herein, but is only limited by the following claims.

I claim:

1. A cargo lift and transport device for a motor vehicle having a first mounting position and a second mounting position, comprising:

an outer column;

a lift column carried by said outer column;

means for providing torque carried by said outer column;

means for providing drive carried by said torque means;

a cargo platform;

means for attaching said device to a motor vehicle; and, means for attaching said cargo platform to said device;

wherein when said device is used in said first mounting position said cargo platform may be raised and lowered between at least a first and second elevation by engaging and selectively reversing the operational direction of said torque providing means, and when said device is used in said second mounting position said cargo platform may be raised and lowered between at least a second and third higher elevation by engaging and selectively reversing the operational direction of said torque providing means, and wherein said second mounting position is approximately 180 degrees from said first mounting position such that said motor vehicle attaching means is used for said cargo platform attaching means and said cargo platform attaching means is used for said motor vehicle attaching means when said device is mounted in said second mounting position.

2. The device of claim 1, wherein said lift column is at least partially slideably engaged within said outer column.

3. The device of claim 1, wherein said torque providing means is a motor.

4. The device of claim 1, wherein said torque providing means is a hand crank.

5. The device of claim 1, wherein said drive means comprises a threaded lifting rod having a first and a second end, said threaded lifting rod being disposed adjacent to and in cooperative engagement with said torque providing means, said threaded rod being constrained by, yet rotatable within, at least a portion of said lift column, whereby said lift column is moved in a substantially vertical plane upon activation of said torque providing means.

6. The device of claim 1, wherein said means for attaching said device to a motor vehicle comprises a first female connector disposed adjacent and connected to said outer column, a second female connector disposed adjacent and connected to a towing frame, said towing frame being connected to said motor vehicle, a female-to-female adapter and means for removably interconnecting said first and said second female connectors via said female-to-female adapter.

7. The device of claim 6, wherein said means for interconnecting said first and said second female connectors comprises at least a first opening passing through said first female connector, at least a first opening passing through said second female connector, at least a second opening passing through said first female connector, at least a second opening passing through said second female connector, at least a first opening passing through said female-to-female adapter and formed on the distal end of said female-to-female adapter, at least a second opening passing through said female-to-female adapter and formed on the distal end of said female-to-female adapter, at least a first opening passing through said female-to-female adapter and formed on the proximal end of said female-to-female adapter, at least a second opening passing through said female-to-female adapter and formed on the proximal end of said female-to-female adapter such that said at least first and second openings of said first female connector may be aligned in mutually adjacent orientation with said at least first and second openings of the proximal end of said female-to-female adapter, and at least one fastening means for passing substantially through said at least first and second openings in said first female connector and said female-to-female adapter when said at least first and second openings are aligned in said mutually adjacent orientation, and wherein said at least first and second openings of said second female connector may be aligned in mutually adjacent orientation with said at least first and second openings of the distal end of said female-to-female adapter, and at least one fastening means for passing substantially through said at least first and second openings in said second female connector and said female-to-female adapter when said at least first and second openings are aligned in said mutually adjacent orientation.

8. The device of claim 7, wherein said fastening means is a pin.

9. The device of claim 1, wherein said means for attaching said cargo platform to said device comprises a male connector disposed adjacent and connected to said cargo platform, a female connector disposed adjacent and connected to said lift column, and means for removably interconnecting said male and female connectors with respect to one another.

10. The device of claim 9, wherein said means for interconnecting said male and female connectors comprises at least a first opening passing through said male connector, at least a first opening passing through said female connector, at least a second opening passing through said male connector, at least a second opening passing through said female connector, such that said at least first and second openings may be aligned in mutually adjacent orientation, and at least one fastening means for passing substantially through said at least first and second openings in said male and female connectors when said at least first and second openings are aligned in said mutually adjacent orientation.

11. The device of claim 10, wherein said fastening means is a pin.

12. A cargo lift and transport device for a motor vehicle having a first mounting position and a second mounting position, comprising:

a telescoping lift means;

means for providing torque carried by said telescoping lift means;

means for providing drive carried by said torque means;

a cargo platform;

means for attaching said device to a motor vehicle; and, means for attaching said cargo platform to said device;

wherein when said device is used in said first mounting position said cargo platform may be raised and lowered between at least a first and second elevation by engaging and selectively reversing the operational direction of said torque providing means, and when said device is used in said second mounting position said cargo platform may be raised and lowered between at least a second and third higher elevation by engaging and selectively reversing the operational direction of said torque providing means, and wherein said second mounting position is approximately 180 degrees from said first mounting position such that said motor vehicle attaching means is used for said cargo platform attaching means and said cargo platform attaching means is used for said motor vehicle attaching means when said device is mounted in said second mounting position.

13. The device of claim 12, wherein said telescoping lift means comprises at least a lift column which is at least partially slideably engaged within an outer column.

14. The device of claim 12, wherein said torque providing means is a motor.

15. The device of claim 12, wherein said torque providing means is a hand crank.

16. The device of claim 12, wherein said drive means comprises a threaded lifting rod having a first and second end, said threaded lifting rod being disposed in cooperating engagement with said torque providing means, said threaded rod being constrained by, yet rotatable within, at least a portion of at least said lift column, whereby said lift column is moved in a substantially vertical plane upon activation of said torque providing means.

17. The device of claim 13, wherein said means for attaching said device to a motor vehicle is slideably adjustable around said outer column.

18. The device of claim 17, wherein said means for attaching said device to a motor vehicle comprises a first female connector disposed adjacent and connected to said outer column, a second female connector disposed adjacent and connected to a towing frame, said towing frame being connected to said motor vehicle, a female-to-female adapter and means for removably interconnecting said first and said second female connectors via said female-to-female adapter.

19. The device of claim 18, wherein said means for interconnecting said first and said second female connectors comprises at least a first opening passing through said first female connector, at least a first opening passing through said second female connector, at least a second opening passing through said first female connector, at least a second opening passing through said second female connector, at least a first opening passing through said female-to-female adapter and formed on the distal end of said female-tofemale adapter, at least a second opening passing through said female-to-female adapter and formed on the distal end of said female-to-female adapter, at least a first opening passing through said female-to-female adapter and formed on the proximal end of said female-to-female adapter, at least a second opening passing through said female-to-female adapter and formed on the proximal end of said female-to-female adapter, and pin fasteners, wherein said at least first and second openings of said first female connector may be aligned in mutually adjacent orientation with said at least first and second openings of the proximal end of said female-to-female adapter, such that at least one said pin fastener passes substantially through said at least first and second openings in said first female connector and said female-to-female adapter when said at least first and second openings are aligned in said mutually adjacent orientation, and wherein said at least first and second openings of said second female connector may be aligned in mutually adjacent orientation with said at least first and second openings of the distal end of said female-to-female adapter, such that at least one said pin fastener passes substantially through said at least first and second openings in said second female connector and said female-to-female adapter when said at least first and second openings are aligned in said mutually adjacent orientation.

20. The device of claim 12, wherein said means for attaching said cargo platform to said device comprises a male connector disposed adjacent and connected to said cargo platform, a female connector disposed adjacent and connected to said lift column, and means for removably interconnecting said male and female connectors with respect to one another.

21. The device of claim 20, wherein said means for interconnecting said male and female connectors comprises at least a first opening passing through said male connector, at least a first opening passing through said female connector, at least a second opening passing through said male connector, at least a second opening passing through said female connector and pin fasteners, wherein said at least first and second openings may be aligned in mutually adjacent orientation, such that at least one pin fastener passes substantially through said at least first and second openings in said male and female connectors when said at least first and second openings are aligned in said mutually adjacent orientation.

22. A cargo lift and transport device for a motor vehicle having a first mounting position and a second mounting position, comprising:

a cargo platform having a male connector carried thereby;

a lift column which is at least partially slideably engaged within an outer column;

a torque providing means;

a screw, said screw being cooperatively engaged with said torque providing means, said screw further being constrained by, yet rotatable within, at least a portion of said lift column;

a female-to-female adapter having a first end and a second end, said second end of said female-to-female adapter cooperatively engaged with a motor vehicle-to-trailer hitch;

a first female connector carried by and slideably adjustable around said outer column, said first female connector cooperatively engaged with said first end of said female-to-female adapter when said device is in said first mounting position;

a second female connector carried by said lift column for cooperatively engaging said male connector of said cargo platform when said device is in said first mounting position, wherein said first female connector is cooperatively engaged with said cargo platform and said second female connector is cooperatively engaged with said first end of said female-to-female adapter when said device is in said second mounting position, and wherein when said device is used in said first mounting position said cargo platform may be raised and lowered between at least a first and second elevation by engaging and selectively reversing the operational direction of said torque providing means, and when device is used in said second mounting position said cargo platform may be raised and lowered between at least a second and third higher elevation by engaging and selectively reversing the operational direction of said torque providing means.

23. The device of claim 22, wherein said torque providing means is an electric motor.

* * * * *